United States Patent [19]

Kawashima et al.

[11] Patent Number: 5,185,907
[45] Date of Patent: Feb. 16, 1993

[54] HOSE CLAMP ASSEMBLY

[75] Inventors: Makinori Kawashima, Suwa; Minoru Nakamura, Sayama, both of Japan

[73] Assignees: Kanesan Manufacturing Co., Ltd.; Honda Giken Kogyo Kabushiki Kaisha, both of Japan

[21] Appl. No.: 848,145

[22] Filed: Mar. 9, 1992

[30] Foreign Application Priority Data

Jun. 5, 1991 [JP] Japan ................. 3-72890[U]

[51] Int. Cl.⁵ ............................................. B65D 63/00
[52] U.S. Cl. ................................. 24/20 R; 24/20 CW
[58] Field of Search ............ 24/20 R, 20 S, 20 CW, 24/20 EE, 22, 23 R, 23 EE, 179

[56] References Cited

U.S. PATENT DOCUMENTS

| | | | |
|---|---|---|---|
| 4,275,484 | 6/1981 | Irio et al. | 24/23 EE |
| 4,305,179 | 12/1981 | Sakurada | 24/20 R |
| 4,674,720 | 6/1987 | Fetsch | 24/23 EE |
| 4,858,279 | 8/1989 | Kato et al. | 24/20 R |
| 4,882,814 | 11/1989 | Takahashi | 24/20 R |
| 4,969,240 | 11/1990 | Sauer | 24/20 R |
| 4,996,749 | 3/1991 | Taskahashi | 24/20 R |

Primary Examiner—Victor N. Sakran

[57] ABSTRACT

A hose clamp assembly comprises a belt form of a plate spring body which is in an annular form having opposite ends and is provided with a grooved notch in which an extending piece to be described just below is inserted in a free state to form the same circumferential plane; an extending piece which is integrally provided at one end of the plate spring body along its circumferential direction, bent at its extreme end outwardly along the diametrical direction of the plate spring body to form a stopper and includes a pair of projecting tongues extending outwardly and vertically with respect to its both widthwise sides, the tongues inclining at their extreme ends at the required angles with respect to the stopper; and a receiving piece provided at the extreme end of the other end of the plate spring body, the receiving piece being bent outwardly along the diametrical direction thereof and including a notch somewhat wider in width than the extending piece and a horizontal portion provided with locking grooves spaced away from each other at an interval corresponding to the space between the pair of locking tongues and formed at the required angles increasingly inclined as they go up.

1 Claim, 4 Drawing Sheets

HOSE CLAMP ASSEMBLY

BACKGROUND OF THE INVENTION

This invention relates to a hose clamp assembly.

For attaching automotive parts in place, for instance, connecting a rubber hose with the pipe of a radiator, spring clamp type of hose assemblies have been used so far in the art, which are mainly broken down into two versions, one shown in FIGS. 12 and 13 and the other in FIGS. 14 and 15.

Referring to the first version of a hose clamp assembly generally shown at 1 in FIG. 12, offsetting pieces 3 and 4 extend circumferentially from both ends of an annular form of belt-like leaf spring body 2, and are bent at their ends outwardly along the diametrical direction of the body 2 to form manipulating tongues 5.

Then, the body 2 is diametrically increased from such a free state shown in FIG. 12 by nipping the tongues 5 and 5 such as by the force of fingers. After the portion of a hose to be connected in place is inserted into the body 2 in this state, the clamping force is released form the tongues 5 and 5, thereby clamping that portion of the hose by restoring resilient force of the body 2.

Next, reference will be made to a hose clamp assembly shown in FIGS. 14 and 15.

The hose clamp assembly generally shown at 6 is similar in structure to the above hose clamp assembly 1. As illustrated, pieces 8 and 9 provided on a belt form of leaf spring body 7 are bent outwardly along the diametrical direction thereof to form stoppers 10 and 10. In a state where the body 7 is diametrically increased, the opposing stoppers 10 and 10 are temporarily received in a holder 11 C-shaped in section, as illustrated in FIG. 15. After the portion of a hose to be connected in place is inserted into the body 7, the holder 11 is removed using a suitable tool, e.g., pinchers.

However, a problem associated with the former hose clamp 1, which is designed to be manipulated by the user, is that in some applications for which strong clamping force is needed, the belt form of leaf spring body is required to have an increased spring constant, thus making it difficult for the user to handle it. A much stronger clamping force may possibly cause the user to suffer from tendovaginits.

On the other hand, the latter hose clamp can be delivered to the user in a temporarily clamped state; for use, only holder removal is needed for the user. Hence, the problem with the former hose clamp can be well solved.

With the latter holder clamp, however, the following problems arise from the required use of a separate holder.

The first problem is that it incurs some considerable expense, primarily because there is an increase in the number of production and assembling steps and the holder is designed to be discarded after use. The second is that when the holder is removed, there is a fear that it may be snapped out by the strong resilient force of the spring body, causing the worker to become injured. The third is that unless the thrown-away holder is kept in store, it is then impossible to pre-clamp the clamp assembly temporarily when the hose is subsequently replaced by a new one.

A further version of a hose clamp assembly, such as that shown in FIGS. 16 and 17, has been proposed as well.

The hose clamp assembly shown generally at 12 includes a belt form leaf spring body 14 which is in an annular form which has opposing ends and is provided with a groove 13 on the side opposite to an extending piece to be described just below, in which the extending piece is inserted in a free state to form the same circumference, an extending piece 17 integrally provided at one end of said spring body 14, said piece 17 extending in the circumferential direction of said spring body 14 and being bent at its extreme end outwardly along the diametrical direction of said spring body 14 to form a stopper 15 which includes a notch 16, and a receiving piece 20 provided by bending the extremity of the other end of said spring body 14 outwardly along the diametrical direction of said spring body 14, said receiving piece 20 being provided with a notch 18 somewhat wider in width than said extending piece 17, said notch 18 including a locking tongue 19 having a claw 19a at its extreme end, which is engageable within said notch 16 in said stopper 15.

In order to pre-clamp the hose clamp assembly 12 temporarily, the spring body 14 is diametrically increased to engage the claw 19a of the locking tongue 19 of the receiving piece 20 within the notch 16 in the stopper 15 of the extending piece 17. Then, external force is applied to the clamp assembly to disengage the claw 19a from within the notch 16, thereby releasing the clamp assembly from its pre-clamped state.

However, such a clamp assembly should be temporarily pre-clamped in a factory with the aid of a special tool. Once it is released from its pre-clamped state in situ, therefore, considerable difficulty is involved in reclamping it temporarily.

In view of the above difficulties, a main object of this invention is to provide a spring type of hose clamp assembly which is designed to be pre-clamped temporarily with a part of a leaf spring, thereby eliminating all the above problems substantially, and which, once pre-clamped temporarily, remains intact even upon subjected to impacts, vibrations or other vagaries.

SUMMARY OF THE INVENTION

In order to attain the above object, the present invention provides a hose clamp assembly comprising in combination:

a belt form of a plate spring body which is in an annular form having opposite ends and is provided with a grooved notch in which an extending piece to be described just below is inserted in a free state to form the same circumferential plane, an extending piece which is integrally provided at one end of said plate spring body along its circumferential direction, bent at its extreme end outwardly along the diametrical direction of said plate spring body to form a stopper and includes a pair of projecting tongues extending outwardly and vertically with respect to its both widthwise sides, said tongues inclining at their extreme ends at the required angles with respect to said stopper, and a receiving piece provided at the extreme end of the other end of said plate spring body, said receiving piece being bent outwardly along the diametrical direction thereof and including a notch somewhat wider in width than said extending piece and a horizontal portion provided with locking grooves spaced away from each other at an interval corresponding to the space between said pair of locking tongues and formed at the required angles increasingly inclined as they go up.

In order to pre-clamp this assembly temporarily, the plate spring body is diametrically increased with the aid of a suitable tool, and the locking tongues extending outwardly and vertically from both sides of the extending piece are passed through the notch in the receiving piece. Then, the force acting on the spring body to increase it diametrically is released from it, the inclining projections extending from the extreme ends of said locking tongues are engaged within the locking grooves in the receiving piece to pre-clamp the hose clamp temporarily. In the pre-clamped state, the above inclining projections are forced in the deepest regions of the locking grooves by the force acting on the spring body to increase it diametrically, whereby the hose clamp can remain intact even upon exposed to impacts, vibrations or other vagaries.

In order to release the hose clamp from its pre-clamped state, for instance, a screwdriver is wedged in between the above inclining projections and the locking grooves.

BRIEF DESCRIPTION OF THE DRAWINGS

The present invention will now be explained specifically but not exclusively with reference to the accompanying drawings, in which.

EXPLANATION OF THE PREFERRED EMBODIMENT

Figure 1:
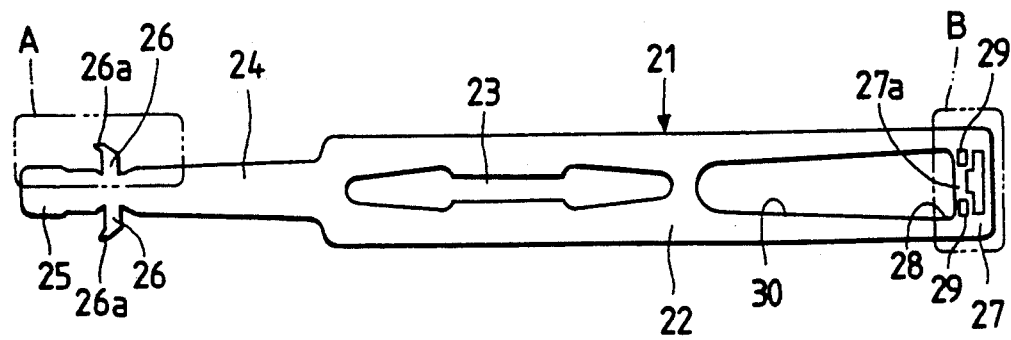
FIG. 1 is an exploded plan view of the hose clamp according to this invention.
Figure 2:
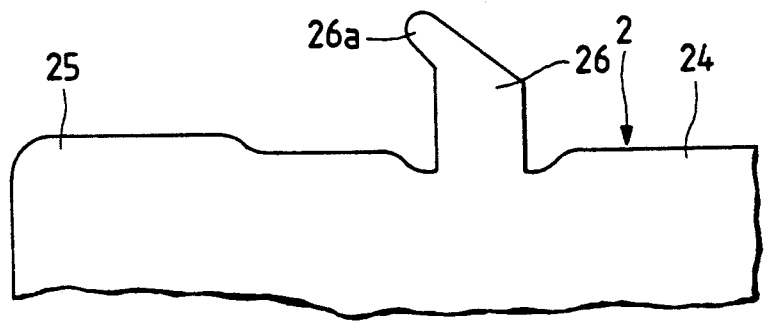
FIG. 2 is an enlarged view showing a portion encircled by A in FIG. 1.
Figure 3:
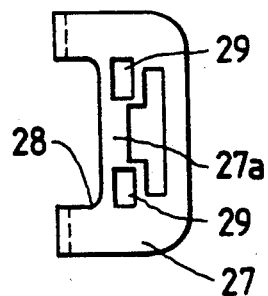
FIG. 3 is an enlarged view showing a portion encircled by B in FIG. 1.
Figure 4:
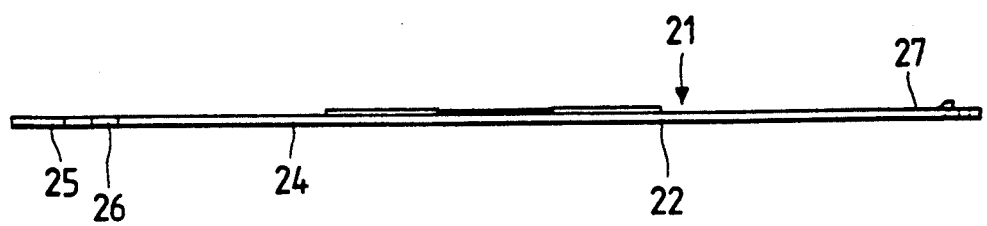
FIG. 4 is an exploded front view showing the hose clamp assembly according to this invention.
Figure 5:
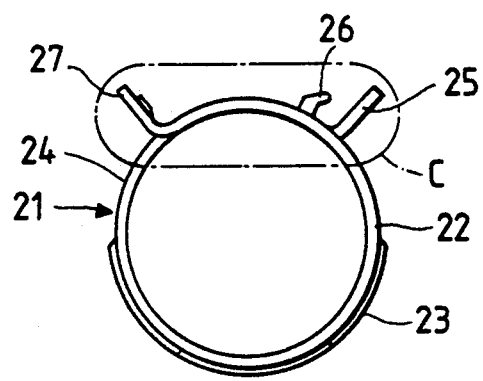
FIG. 5 is a front view of the hose clamp assembly in its free state.

Referring to the drawings, there is shown a hose clamp assembly 21, which is generally made up of a single belt form leaf or plate spring.

A belt form of plate spring body 22 is in an annular form having its both ends opposite to each other, and is provided with a rib 23 extending along its circumferential direction.

A piece 24 extends from one end of the plate spring body 22 along its circumferential direction by the required length, and is bent at its extreme end outwardly along the diametrical direction of the plate spring body 22 to form a stopper 25.

The extending piece 24 is provided on its both widthwise sides with a pair of locking tongues 26 and 26 extending outwardly and vertically with respect to the plate spring body 22, which have their extreme end 26a and 26a projecting at the necessary angle of inclination with respect to the stopper 25.

A receiving piece 27 extends from the other end of the plate spring body 22, and is bent outwardly along the diametrical direction of the plate spring body 22.

The receiving piece 27 is provided with a notch 28 somewhat wider in width than the extending piece 24, and includes a horizontal portion 27a having locking grooves 29 and 29 spaced away from each other at an interval corresponding to the space between a pair of locking tongues 26 and 26 and formed at the necessary angles increasingly inclined as they go up. It should be borne in mind that the angle $\theta$ of inclination of each locking groove 29 is 30° in the illustrated embodiment, but may be larger or smaller than that. At an angle smaller than 30° the clamp assembly is more easily released from its clamped state, while at an angle larger than 30° the clamp assembly is more firmly clamped. Thus, to what degree the clamp assembly is clamped can freely be adjusted by a suitable combination of the angle of inclination of each locking groove 29 with the angle of inclination of the projecting piece 26a of each locking tongue 26.

The other end of the plate spring body 22 is also provided with a grooved notch 30 in which the extending piece 24 is inserted to form the same circumferential plane.

Reference will now be made to how to use this hose clamp assembly.

Figure 6:
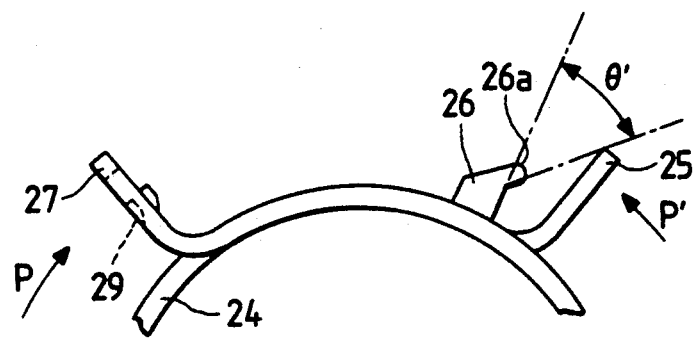
FIG. 6 is an enlarged view showing a portion encircled by C in FIG. 5.
Figure 7:
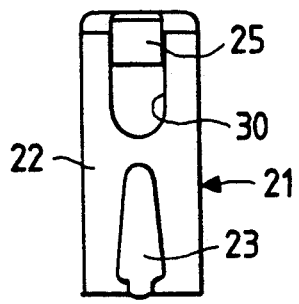
FIG. 7 is a righthanded view of the hose clamp assembly in its free state.

In order to put the hose clamp assembly 21 in its pre-clamped state, which is delivered to the user in that state, the plate spring body 22 is diametrically increased with the aid of a suitable tool. To this end, pressures may be applied to the clamp assembly in directions, as shown by P and P' in FIG. 6.

Figure 10:
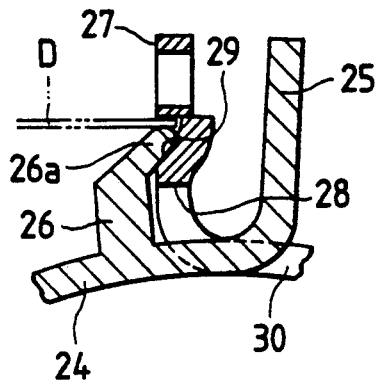
FIG. 10 is a partially enlarged sectional view of the hose clamp assembly held temporarily.
Figure 8:
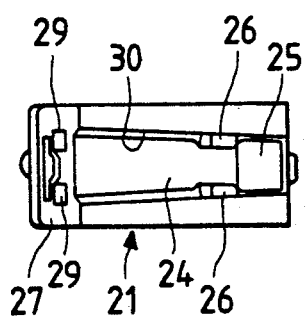
FIG. 8 is a plan view of the hose clamp assembly in its free state.
Figure 11:
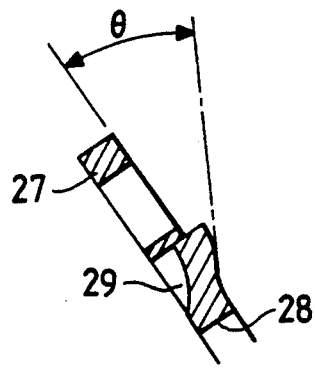
FIG. 11 is an enlarged sectional view of the receiving piece.
Figure 9:
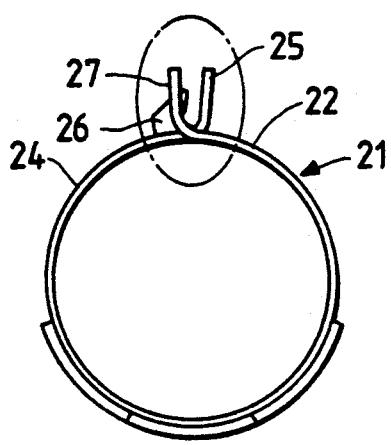
FIG. 9 is a front view of the hose clamp assembly held temporarily.
Figure 12:
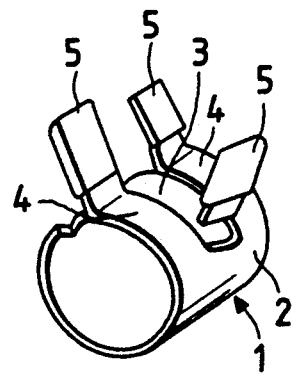
FIG. 12 is a perspective view of a conventional hose clamp.
Figure 13:
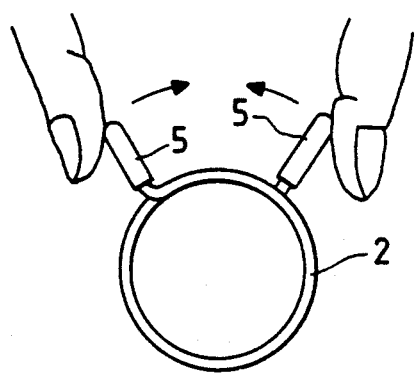
FIG. 13 illustrates how to use the conventional hose clamp shown in FIG. 12.
Figure 16:
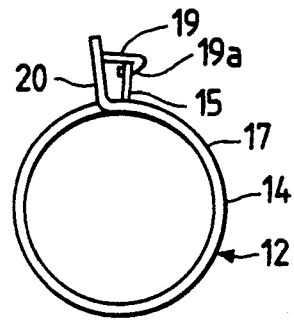
FIG. 16 is a front view of a still further hose clamp in its pre-clamped state.
Figure 14:
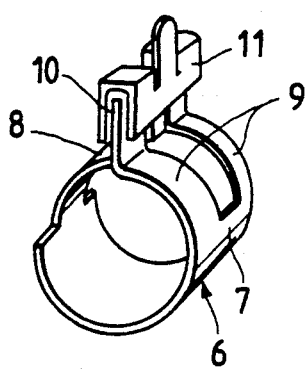
FIG. 14 is a perspective view of another conventional hose clamp in its pre-clamped state.
Figure 17:
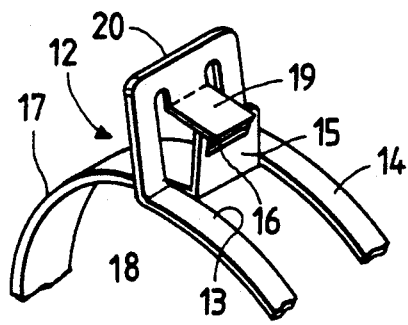
FIG. 17 is a partially enlarged perspective view of the conventional hose clamp shown in FIG. 16.
Figure 15:
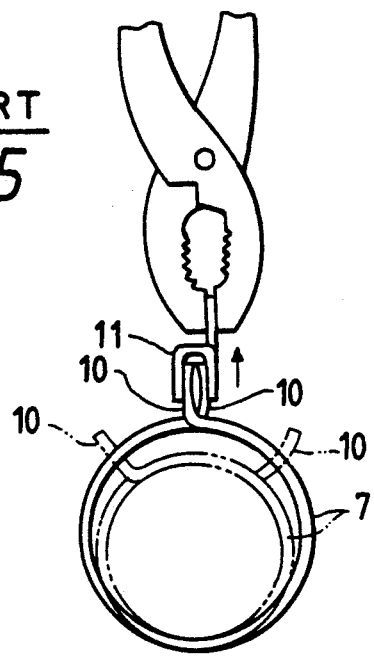
FIG. 15 illustrates how to release the conventional hose clamp from its pre-clamped state.

Just when a pair of locking tongues 26 and 26 go through the notch 28 in the receiving piece 27, as shown in FIGS. 9 and 10, the applied external force is removed. This enables the inclined projecting tongues 26a and 26a of the locking tongues 26 and 26 to be engaged within the locking grooves 29 and 29, whereby the hose clamp assembly is placed in its pre-clamped state.

In order to allow the assembly to clamp together a hose with this assembly, what must be carried out by the assembly is only to wedge a driver D or other tool in between the inclined projecting tongues 26a and 26a of the locking grooves 26 and 26 and the locking grooves 29 and 29.

As mentioned above, this invention provides a hose clamp assembly which can be supplied to the assembly in its pre-clamped state achieved by increasing the spring body diametrically. Thus, the hose clamp assembly, even if made up of a belt form plate spring body having an increased spring constant, can be easily handled by the assembly.

On account of the lack of a need to provide a separate holder for pre-clamping, the present hose clamp assembly is economical and unlikely to suffer from disadvantages which may otherwise be caused by the use of such a separate holder. Nor is the worker likely to be injured by such a separate holder which may be snapped out at the time of its removal.

Once the present hose clamp assembly has been released from its clamped state in situ, it may be easily reclamped with the aid of an available tool without recourse to any special tool.

In addition, the present hose clamp assembly can be more firmly clamped in place than before and so can remain intact upon receiving impacts, vibrations or other vagaries, because the inclining projections are provided at the extreme ends of a pair of locking tongues, while the depths of the locking grooves formed in the receiving piece increase as they go up.

Furthermore, to what degree the clamp assembly is clamped can freely be adjusted by a suitable combination of the angle of inclination of each locking groove with the angle of inclination of the projecting piece of each locking tongue.

Thus, the hose clamp assembly according to this invention has a number of merits.

What is claimed is:

1. A hose clamp assembly comprising in combination:
   a belt form of a plate spring body which is in an annular form having opposite ends and is provided with a grooved notch in which an extending piece to be described just below is inserted in a free state to form the same circumferential plane,
   an extending piece which is integrally provided at one end of said plate spring body along its circumferential direction, bent at its extreme end outwardly along the diametrical direction of said plate spring body to form a stopper and includes a pair of projecting tongues extending outwardly and vertically with respect to its both widthwise sides, said tongues inclining at their extreme ends at the required angles with respect to said stopper, and
   a receiving piece provided at the extreme end of the other end of said plate spring body, said receiving piece being bent outwardly along the diametrical direction thereof and including a notch somewhat wider in width than said extending piece and a horizontal portion provided with locking grooves spaced away from each other at an interval corresponding to the space between said pair of locking tongues and formed at the required angles increasingly inclined as they go up.

* * * * *